UNITED STATES PATENT OFFICE.

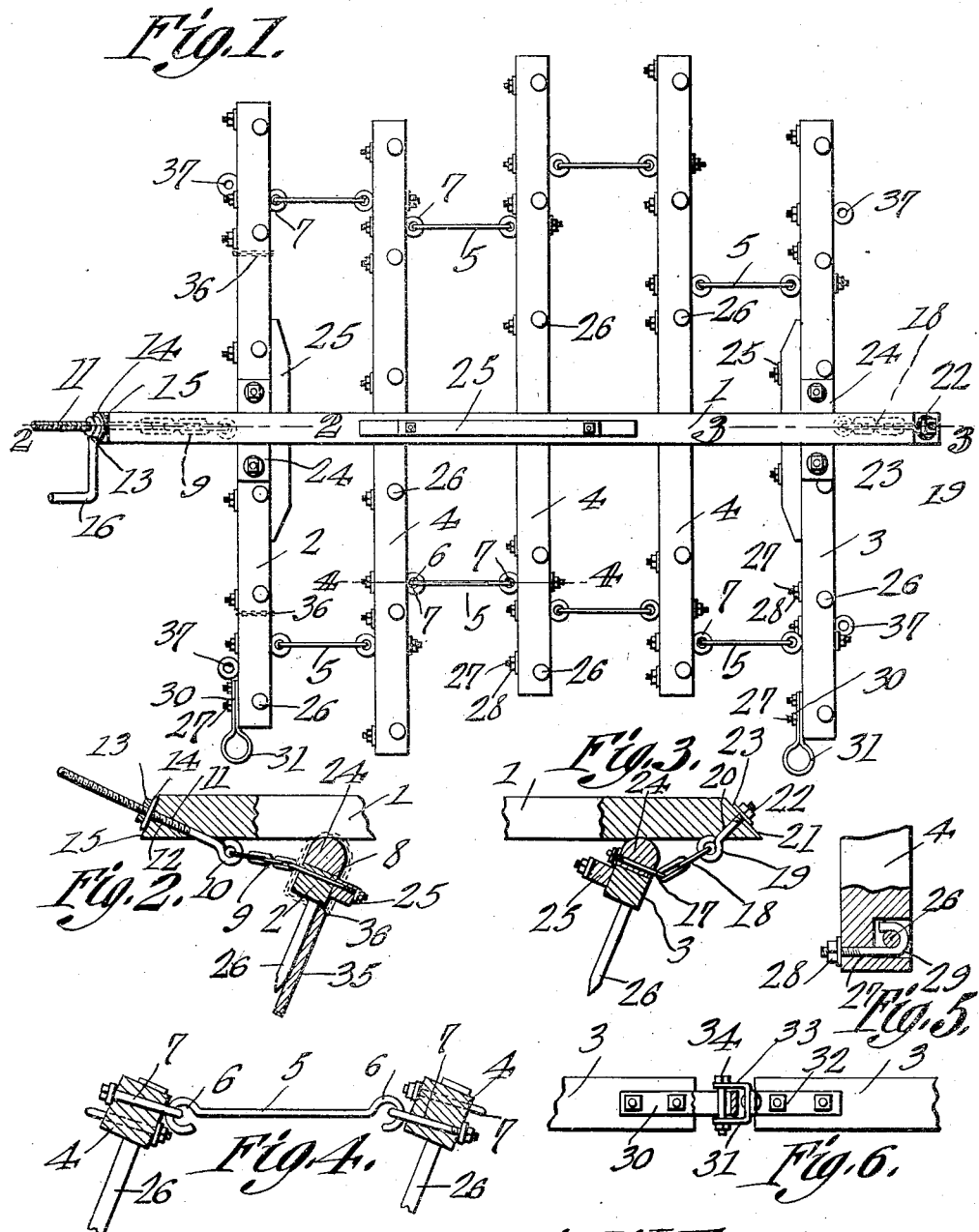

ALEXANDER W. ENGLAND, OF FRANKLIN, INDIANA.

HARROW.

1,198,335. Specification of Letters Patent. Patented Sept. 12, 1916.

Application filed August 19, 1915. Serial No. 46,307.

*To all whom it may concern:*

Be it known that I, ALEXANDER W. ENGLAND, a citizen of the United States, residing at Franklin, in the county of Johnson and State of Indiana, have invented a new and useful Harrow, of which the following is a specification.

The present invention appertains to harrows and aims to provide a harrow of novel and improved construction whereby it will possess a marked degree of utility and efficiency.

This harrow comprises a longitudinal beam and loosely connected transverse teeth bars, and connections between the said bars and the beam, whereby the bars may be loosened or tightened, whichever is desired, and for controlling the harrow teeth secured to the bars, the harrow embodying a unique assemblance of the component parts.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a plan view of the improved harrow. Figs. 2, 3 and 4 are enlarged sectional views taken on the lines 2—2, 3—3, and 4—4, respectively, of Fig. 1. Fig. 5 is a sectional detail of one of the bars illustrating the means for fastening one of the harrow teeth in place. Fig. 6 is a fragmental detail illustrating a coupling employed for connecting two of the harrows side by side.

The improved harrow comprises a longitudinal beam 1 and transverse bars disposed below the same and including the end bars 2 and 3 and the intermediate bars 4, said bars being parallel with one another and projecting to the opposite sides of the beam 1. The bars are loosely connected by means of links 5 having terminal hooks 6 engaged to the eyes of eye bolts 7 having their shanks engaged through the bars. Each pair of bars is connected by a pair of links. The eyes of the bolts 7 at those sides of the bars which face in the same direction are arranged adjacent the upper surfaces of the bars, while the eyes of the bolts 7 at those sides of the bars which face in the opposite direction are arranged adjacent the lower surfaces of the bars, or in other words, the first mentioned eyes are arranged higher with respect to the bars than the last mentioned eyes, as clearly seen by reference to Fig. 4. The shanks of the bolts 7 preferably extend at a slight angle through the bars as suggested in Fig. 4.

The end bars 2 and 3 are connected to the ends of the beam 1 as will presently appear. An eye bolt 8 has its shank engaged through the end bar 2 and a short chain or flexible element 9 has one end engaged to the eye of the bolt 8, and has its other end engaged to the eye 10 of a rod 11 extending slidably through an oblique or inclined bore 12 with which the respective end portion of the beam 1 is provided. The bore 12 extends from the said end of the beam to the lower surface of said beam, and a nut 13 is threaded upon the rod 11 adjacent said end of the beam. A washer 14 is preferably disposed between the nut 13 and the said end 15 of the beam, which end is inclined so as to lie at right angles with the bore 12. The nut 13 has a crank handle 16 in order that the nut may be conveniently and forcibly rotated. An eye bolt 17 has its shank connected to the other end bar 3 and one end of a short chain or flexible element 18 is engaged to the eye of the bolt 17, while the other end of the chain 18 is connected to the eye of an eye bolt 19 having its shank engaged through an oblique or inclined bore 20 provided in the other end portion of the beam 1. The respective end 21 of the beam 1 is inclined so as to lie at right angles with the bore 20, and a nut 22 is threaded upon the shank of the bolt 19 and seats against a washer 23 disposed between the nut 22 and the end 21.

The end bars 2 and 3 are provided between their ends with upstanding rounded bearing blocks 24 which are bolted or otherwise fastened to said bars, and the blocks 24 bear upwardly against the lower surface of the beam 1.

The beam 1 and end bars 2 and 3 are each strengthened or braced by a brace 25 bolted or otherwise fastened thereto, to prevent the bending of the respective parts when under strain. The braces 25 thus prevent the beam 1 and end bars 2 and 3 from bowing when the rod 11 is adjusted for tightening up the harrow bars and their connections. The braces 25 are in the form of cleats. The brace or cleat 25 of the beam 1 is disposed longitudinally thereof upon its upper surface between the ends thereof, and the braces or cleats 25 of the end bars 2 and 3 are upon the inner sides thereof and project to opposite sides of those points of the bars to which the chains 9 and 18 are connected.

A plurality of harrow teeth 26 are engaged downwardly through each bar and hook bolts 27 have their shanks engaged through the bar and have their hooks engaging the harrow teeth, nuts 28 being threaded upon the shanks of the bolts 27 for drawing the bolts 27 so that the teeth 26 will be clamped tight by the hooks of the bolts 27. The bars have recesses 29 for receiving and accommodating the hooks of the bolts 27.

When it is desired to couple two of the harrows side by side, to double the harrowing capacity, doubled bars or straps 30 have their terminals bolted or otherwise fastened to the ends of the bars 2 and 3 at one side of the harrow, and have loops or eyes 31. Bars or straps 32 are bolted or otherwise fastened to the corresponding bars of the other harrow and have forks 33 for straddling the loops 31, whereby bolts or other attaching elements 34 may be engaged through the forks 33 to pass through the loops 31. This will couple the two harrows together, whereby they may be drawn about as a single harrow. One of the couplings or connections is illustrated in Fig. 6, but it will be apparent that a pair of them are employed, as suggested by the two bars or straps 30 in Fig. 1.

A board or blade 35 is attached loosely to the bar 2 by means of chains or other flexible elements 36, whereby the board 35 will rest against the respective teeth 26 when the bar 3 is pulled forward. The board 35 will swing away from the respective teeth 26 when the bar 2 is pulled forward.

The bars 2 and 3 each have eyes 37 for the attachment of the chains or other flexible elements for hitching the draft animal or animals to the harrow.

In use, when the nut 13 is unscrewed so that the rod 11 slides backwardly through the bore 12, the chains 9 and 18 are slackened, and this loosens the bars 2, 3 and 4, whereby they can work loosely to a limited extent with respect to the beam 1. By rotating the nut 13 to pull the rod 11 upwardly, the chains 9 and 18 and the links 5 will be drawn taut, so that the bars will be tightened and held substantially rigid with respect to the beam 1, it being noted that when the connections for the bars are tightened, the bearing blocks 24 bear against the beam 1 and the links 5 being under tensile strain, will hold the intermediate bars 4 in place between the end bars 2 and 3. When the rod 11 is drawn outwardly with suitable force, by rotating the nut 13, the bars will be tilted about their longitudinal axes, to tilt the harrow teeth 26, as suggested in Figs. 2, 3 and 4. Thus, the blocks 24 bearing against the beam 1 will serve to tilt the end bars 2 and 3, and due to the connections of the links 5 with the bars as above indicated, the bars 4 will be tilted when the links are drawn taut, since the links will tend to be pulled into the same plane.

For ordinary harrowing purposes, the draft animal or animals are hitched to the bar 3, whereby the teeth 26 will readily ride over the soil for pulverizing the same. When it is desired to accomplish the cultivation of the soil, the draft animals are hitched to the bar 2, whereby when the harrow is drawn with the bar 2 foremost, the pointed ends of the teeth 26 will work into the soil for cultivating the same. The harrow may be drawn about by hitching the draft animals to one or both eyes 37 of the respective end beam.

The bars or straps 30 are preferably fastened by the respective bolts 27, whereby said bolts have the double function of fastening the bars 30 and the respective harrow teeth 26.

When the bar 3 is pulled forward, the board 35 when used, will trail in rear of the bars 4, and will serve to finish the surface of the soil in an effective manner. When the bar 2 is pulled, the board 35 will trail in rear thereof for acting as an evener, to assist in evening or leveling the soil.

The bars 2, 3 and 4 and the beam 1 may be constructed of wood or angle iron, whichever is preferred.

Having thus described the invention, what is claimed as new is:—

A harrow comprising a beam having inclined ends and inclined bores extending from said ends to the lower surface of the beam, members engaged through said bores, nuts threaded upon said members and seating against said ends of the beam, transverse bars below the beam and having teeth, eye bolts engaged in opposite directions through the bars and arranged adjacent the upper and lower surfaces of said bars, links having terminal hooks engaging the eyes of said bolts, the end bars having upstanding bearing portions bearing against the beam, chains connecting said members and end bars, a longitudinal cleat secured upon the upper surface of the beam between the ends thereof, and cleats secured to the inner sides of the end bars and projecting in opposite directions beyond the points to which said chains are connected.

In testimony that I claim the foregoing as my own, I have hereto affixed my signature in the presence of two witnesses.

ALEXANDER W. ENGLAND.

Witnesses:
MELVIN WHEELER,
CLINT DURHAM.